United States Patent
Ozono et al.

(10) Patent No.: US 10,753,467 B2
(45) Date of Patent: Aug. 25, 2020

(54) TRANSMISSION CONTROL DEVICE AND TRANSMISSION CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Haruka Ozono, Hadano (JP); Masahiro Hamano, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 454 days.

(21) Appl. No.: 15/559,032

(22) PCT Filed: Feb. 9, 2016

(86) PCT No.: PCT/JP2016/053847
§ 371 (c)(1),
(2) Date: Sep. 15, 2017

(87) PCT Pub. No.: WO2016/152289
PCT Pub. Date: Sep. 9, 2016

(65) Prior Publication Data
US 2018/0080549 A1 Mar. 22, 2018

(30) Foreign Application Priority Data
Mar. 20, 2015 (JP) .................. 2015-057897

(51) Int. Cl.
*F16H 61/12* (2010.01)
*F16H 61/662* (2006.01)
(Continued)

(52) U.S. Cl.
CPC ......... *F16H 61/12* (2013.01); *F16H 61/0021* (2013.01); *F16H 61/662* (2013.01);
(Continued)

(58) Field of Classification Search
CPC ....... F16H 2059/446; F16H 2061/1208; F16H 2061/1224; F16H 2061/1232;
(Continued)

(56) References Cited

U.S. PATENT DOCUMENTS

2005/0251315 A1* 11/2005 Tanaka ................. F16H 61/12
701/51
2008/0004141 A1 1/2008 Toyoda et al.

FOREIGN PATENT DOCUMENTS

| JP | 05-046465 B | 7/1993 |
|---|---|---|
| JP | 2008-020055 A | 1/2008 |
| JP | 2012-154434 A | 8/2012 |

* cited by examiner

*Primary Examiner* — Jacob S. Scott
(74) *Attorney, Agent, or Firm* — Foley & Lardner LLP

(57) ABSTRACT

In a transmission control device, a controller determines failure of one of a variator input side rotation sensor and a variator output side rotation sensor. A hydraulic control circuit and the controller variably control line pressure, and in a case where the failure is determined, fix the line pressure to a predetermined value or more. The hydraulic control circuit and the controller variably control a speed ratio of a variator by a double pressure regulation method, and in a case where the failure is determined, variably control the speed ratio of the variator by a single pressure regulation method.

6 Claims, 5 Drawing Sheets

(51) Int. Cl.
 *F16H 59/40* (2006.01)
 *F16H 59/42* (2006.01)
 *F16H 59/44* (2006.01)
 *F16H 61/00* (2006.01)

(52) U.S. Cl.
 CPC .............. *F16H 59/40* (2013.01); *F16H 59/42* (2013.01); *F16H 59/44* (2013.01); *F16H 2061/1224* (2013.01); *F16H 2061/1232* (2013.01); *F16H 2061/1284* (2013.01)

(58) Field of Classification Search
 CPC ..... F16H 2061/1284; F16H 2061/6614; F16H 2312/16; F16H 59/40; F16H 51/0021; F16H 59/44; F16H 61/12; F16H 61/662; F16H 61/66231; F16H 61/66236; F16H 61/702
 See application file for complete search history.

TRANSMISSION CONTROL DEVICE AND TRANSMISSION CONTROL METHOD

TECHNICAL FIELD

The present invention relates to a transmission control device and a transmission control method.

BACKGROUND ART

A technique of performing a fail-safe at the time of failure of a rotation speed sensor of a secondary pulley in a continuously variable transmission is disclosed in JP5-46465B. In this technique, at the time of the failure of the rotation speed sensor of the secondary pulley, by fixing a speed ratio to the maximum speed ratio, that is, the lowest speed ratio, and fixing line pressure to the maximum line pressure, belt slippage is prevented. In this technique, the continuously variable transmission is shifted by a single pressure regulation method of fixing hydraulic control pressure of the secondary pulley to the line pressure.

SUMMARY OF INVENTION

As a shifting method of the continuously variable transmission, there is also a double pressure regulation method of not fixing one of hydraulic control pressure of a primary pulley and hydraulic control pressure of the secondary pulley to the line pressure but making both the hydraulic control pressure variable.

However, JP5-46465B does not disclose a fail-safe technique in a case where shift is performed by the double pressure regulation method. Therefore, a fail-safe technique utilizable in a case where shift is performed by the double pressure regulation method is desired.

The present invention is achieved in consideration of such a technical problem, and an object thereof is to provide a transmission control device and a transmission control method capable of performing a fail-safe at the time of failure of a variator input side rotation sensor and a variator output side rotation sensor in a case where shift is performed by the double pressure regulation method.

A transmission control device according to a certain aspect of the present invention performs control in a transmission. The transmission has a variator having a primary pulley whose groove width is controlled by first hydraulic pressure, a secondary pulley whose groove width is controlled by second hydraulic pressure, and a belt looped over the primary pulley and the secondary pulley, a variator input side rotation sensor adapted to detect rotation speed on the input side of the variator, and a variator output side rotation sensor adapted to detect rotation speed on the output side of the variator. The transmission control device has a failure determination unit adapted to determine failure of one of the variator input side rotation sensor and the variator output side rotation sensor, a line pressure control unit adapted to variably control line pressure serving as source pressure of the first hydraulic pressure and the second hydraulic pressure, and in a case where the failure is determined, to fix the line pressure to a predetermined value or more; and a speed ratio control unit adapted to variably control a speed ratio of the variator by a double pressure regulation method of making both the first hydraulic pressure and the second hydraulic pressure variable, and in a case where the failure is determined, to variably control the speed ratio of the variator by a single pressure regulation method of fixing one of the first hydraulic pressure and the second hydraulic pressure to the line pressure.

According to another aspect of the present invention, a transmission control method for controlling a transmission having a variator which has a primary pulley whose groove width is controlled by first hydraulic pressure, a secondary pulley whose groove width is controlled by second hydraulic pressure, and a belt looped over the primary pulley and the secondary pulley, a variator input side rotation sensor adapted to detect rotation speed on the input side of the variator, and a variator output side rotation sensor adapted to detect rotation speed on the output side of the variator is provided. The transmission control method includes determining failure of one of the variator input side rotation sensor and the variator output side rotation sensor, variably controlling line pressure serving as source pressure of the first hydraulic pressure and the second hydraulic pressure, and in a case where the failure is determined, fixing the line pressure to a predetermined value or more, and variably controlling a speed ratio of the variator by a double pressure regulation method of making both the first hydraulic pressure and the second hydraulic pressure variable, and in a case where the failure is determined, variably controlling the speed ratio of the variator by a single pressure regulation method of fixing one of the first hydraulic pressure and the second hydraulic pressure to the line pressure.

According to these aspects, in a case where the failure is determined, one hydraulic pressure of the first hydraulic pressure and the second hydraulic pressure is fixed to the line pressure of the predetermined value or more. Thus, the one hydraulic pressure can be increased and the other hydraulic pressure can also be boosted. As a result, a fail-safe that suppresses generation of belt slippage at the time of failure can be performed.

According to these aspects, in a case where the failure is determined, by the single pressure regulation method of fixing the one hydraulic pressure to the line pressure, the speed ratio of the variator is variably controlled. Thus, in comparison to a case where the speed ratio of the variator is fixed, deterioration of fuel consumption can be suppressed.

MODE FOR CARRYING OUT INVENTION

Hereinafter, an embodiment of the present invention will be described with reference to the attached drawings.

Figure 1:
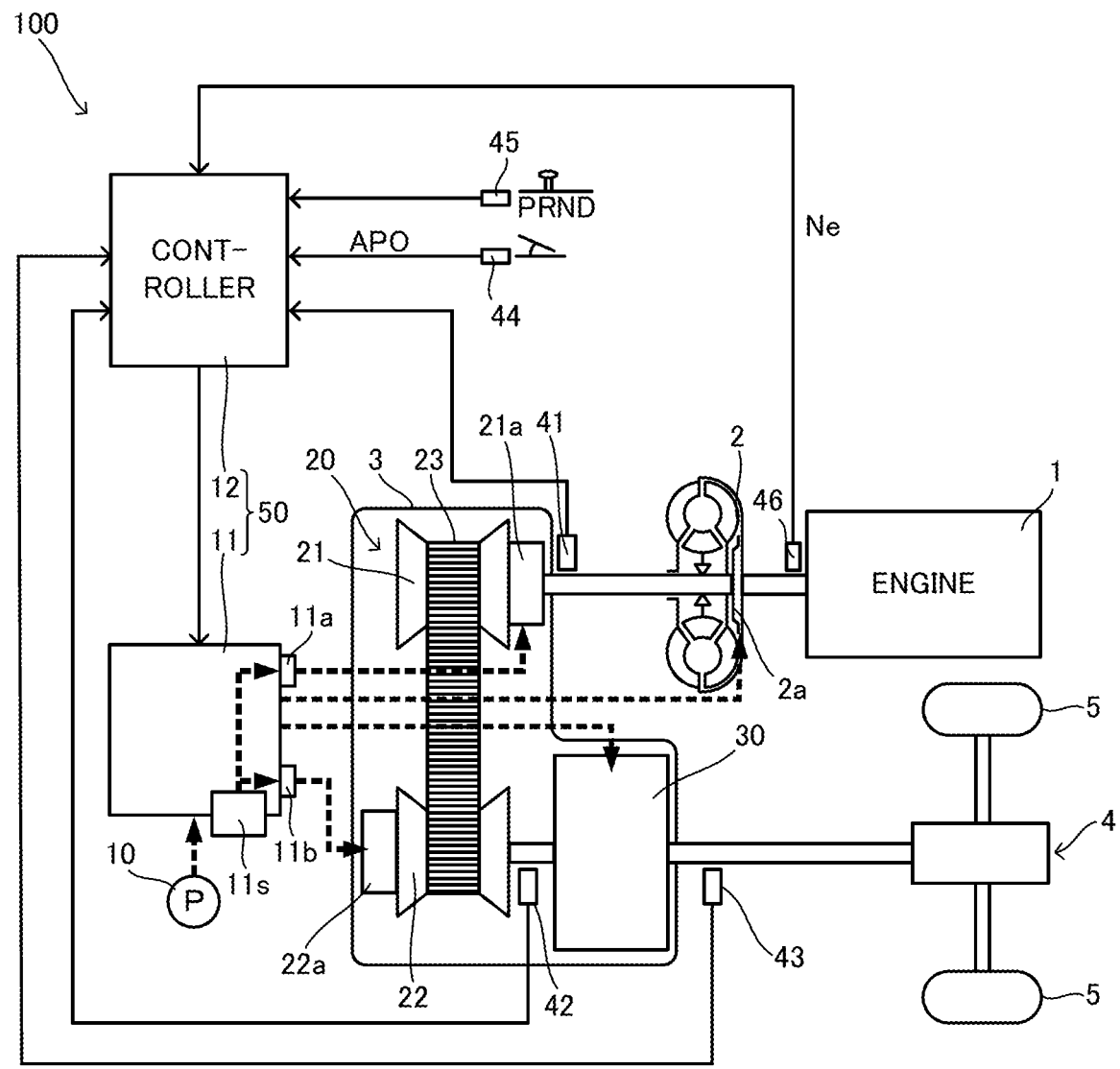
FIG. 1 is a diagram showing major portions of a vehicle including a transmission.

FIG. 1 is a diagram showing major portions of a vehicle including a transmission 100. The vehicle includes an engine 1, a torque converter 2, a variator 20, a sub-transmission mechanism 30, an axle 4, and drive wheels 5.

The engine 1 forms a power source of the vehicle. The torque converter 2 transmits power via a fluid. In the torque converter 2, by engaging a lock-up clutch 2a, power transmission efficiency can be enhanced. The variator 20 and the sub-transmission mechanism 30 output inputted rotation speed as rotation speed in accordance with a speed ratio. The speed ratio has a value obtained by dividing the inputted rotation speed by the outputted rotation speed. The axle 4 is a drive axle formed by a reduction gear and a differential device. The power of the engine 1 is transmitted to the drive wheels 5 via the torque converter 2, the variator 20, the sub-transmission mechanism 30, and the axle 4.

The variator 20 is a continuously variable transmission mechanism including a primary pulley 21, a secondary pulley 22, and a belt 23. Hereinafter, the primary pulley 21 will be also simply referred to as the pulley 21, and the secondary pulley 22 will be also simply referred to as the pulley 22.

The primary pulley 21 includes a fixed conical plate, a movable conical plate, and a hydraulic cylinder 21a. The secondary pulley 22 includes a fixed conical plate, a movable conical plate, and a hydraulic cylinder 22a. In each of the pulleys 21, 22, the fixed conical plate and the movable conical plate are arranged in a state where sheave surfaces face each other to form a V groove. In the pulley 21, the hydraulic cylinder 21a, or in the pulley 22, the hydraulic cylinder 22a is provided on a back surface of the movable conical plate to displace the movable conical plate in the axial direction. The belt 23 is looped over the pulley 21 and the pulley 22. A V belt can be used as the belt 23.

First hydraulic pressure acts on the hydraulic cylinder 21a. In the pulley 21, width of the V groove is controlled by the first hydraulic pressure. Second hydraulic pressure acts on the hydraulic cylinder 22a. In the pulley 22, width of the V groove is controlled by the second hydraulic pressure.

By adjusting the first hydraulic pressure and changing the width of the V groove of the pulley 21, a contact radius of the pulley 21 and the belt 23 is changed. By adjusting the second hydraulic pressure and changing the width of the V groove of the pulley 22, a contact radius of the pulley 22 and the belt 23 is changed. Therefore, by controlling the width of the V grooves of the pulley 21 and the pulley 22, the speed ratio of the variator 20 can be steplessly controlled.

The sub-transmission mechanism 30 is a multi-gear transmission mechanism having gear positions of two forward gear positions and one backward gear position. The sub-transmission mechanism 30 has a first speed gear position and a second speed gear position whose speed ratio is less than the first speed gear position as the forward gear positions. The sub-transmission mechanism 30 is provided on the output side of the variator 20 in series in a power transmission path running from the engine 1 to the drive wheels 5. The sub-transmission mechanism 30 may be directly connected to the variator 20 or may be indirectly connected to the variator 20 via other configurations such as a gear train.

In the vehicle, the speed ratio is changed in each of the variator 20 and the sub-transmission mechanism 30. Therefore, in the vehicle, shift is performed in accordance with a through speed ratio which is a speed ratio of the entirety of the variator 20 and the sub-transmission mechanism 30 obtained by multiplying the speed ratio of the variator 20 by the speed ratio of the sub-transmission mechanism 30.

The variator 20 forms an automatic transmission mechanism 3 together with the sub-transmission mechanism 30. The variator 20 and the sub-transmission mechanism 30 may be formed as structurally individual transmission mechanisms.

The vehicle further includes an oil pump 10, a hydraulic control circuit 11, and a controller 12.

The oil pump 10 generates hydraulic pressure. A mechanical oil pump to be driven by the power of the engine 1 can be used as the oil pump 10.

The hydraulic control circuit 11 adjusts the hydraulic pressure generated by oil supply of the oil pump 10 and transmits to portions of the variator 20 and the sub-transmission mechanism 30. The hydraulic control circuit 11 includes a line pressure adjustment unit 11s, a first hydraulic pressure adjustment unit 11a, and a second hydraulic pressure adjustment unit 11b.

The line pressure adjustment unit 11s adjusts the hydraulic pressure generated by oil supply of the oil pump 10 to generate line pressure. The line pressure is hydraulic pressure serving as source pressure of the first hydraulic pressure and the second hydraulic pressure, and is set in such a manner that slippage of the belt 23 is not generated. The first hydraulic pressure adjustment unit 11a generates the first hydraulic pressure from the line pressure. The second hydraulic pressure adjustment unit 11b generates the second hydraulic pressure from the line pressure. A hydraulic pressure regulator can be used as the line pressure adjustment unit 11s, the first hydraulic pressure adjustment unit 11a, and the second hydraulic pressure adjustment unit 11b.

The controller 12 controls the hydraulic control circuit 11. Output signals of a rotation sensor 41, a rotation sensor 42, and a rotation sensor 43 are inputted to the controller 12. The rotation sensor 41 is a sensor corresponding to a variator input side rotation sensor adapted to detect rotation speed on the input side of the variator 20. The rotation sensor 42 is a sensor corresponding to a variator output side rotation sensor adapted to detect rotation speed on the output side of the variator 20. Specifically, the rotation sensor 42 detects the rotation speed on the output side of the variator 20 and on the input side of the sub-transmission mechanism 30. The rotation sensor 43 is a sensor corresponding to a sub-transmission mechanism output side rotation sensor adapted to detect rotation speed on the output side of the sub-transmission mechanism 30.

Specifically, the rotation speed on the input side of the variator 20 is rotation speed of an input shaft of the variator 20. The rotation speed on the input side of the variator 20 may be rotation speed at a position of the above power transmission path to sandwich, for example, a gear train with the variator 20. The same is applied to the rotation speed on the output side of the variator 20 and the rotation speed on the output side of the sub-transmission mechanism 30.

In addition, output signals of an accelerator position sensor 44, an inhibitor switch 45, an engine rotation sensor 46, and the like are inputted to the controller 12. The accelerator position sensor 44 detects an accelerator position APO which represents an operation amount of an accelerator pedal. The inhibitor switch 45 detects a position of a selector lever. The engine rotation sensor 46 detects rotation speed Ne of the engine 1. The controller 12 can detect vehicle speed VSP on the basis of the output signal of the rotation sensor 43.

The controller 12 generates a shift control signal on the basis of these signals, and outputs the generated shift control signal to the hydraulic control circuit 11. The hydraulic control circuit 11 controls the line pressure, the first hydraulic pressure, and the second hydraulic pressure on the basis of the shift control signal from the controller 12, and in addition, performs switching of a hydraulic path or the like.

Thereby, the hydraulic pressure is transmitted from the hydraulic control circuit 11 to the portions of the variator 20 and the sub-transmission mechanism 30 in accordance with the shift control signal. As a result, the speed ratio of the variator 20 and the sub-transmission mechanism 30 is changed to be a speed ratio in accordance with the shift control signal, that is, a target speed ratio.

The transmission 100 is an automatic transmission having, in addition to the hydraulic control circuit 11 and the controller 12 adapted to control the speed ratio in such a way, the variator 20, the sub-transmission mechanism 30, the rotation sensor 41, the rotation sensor 42, and the rotation sensor 43. The hydraulic control circuit 11 and the controller 12 form a transmission control device 50 for controlling the transmission 100. Hereinafter, the transmission control device 50 will be simply referred to as the control device 50.

Figure 2:
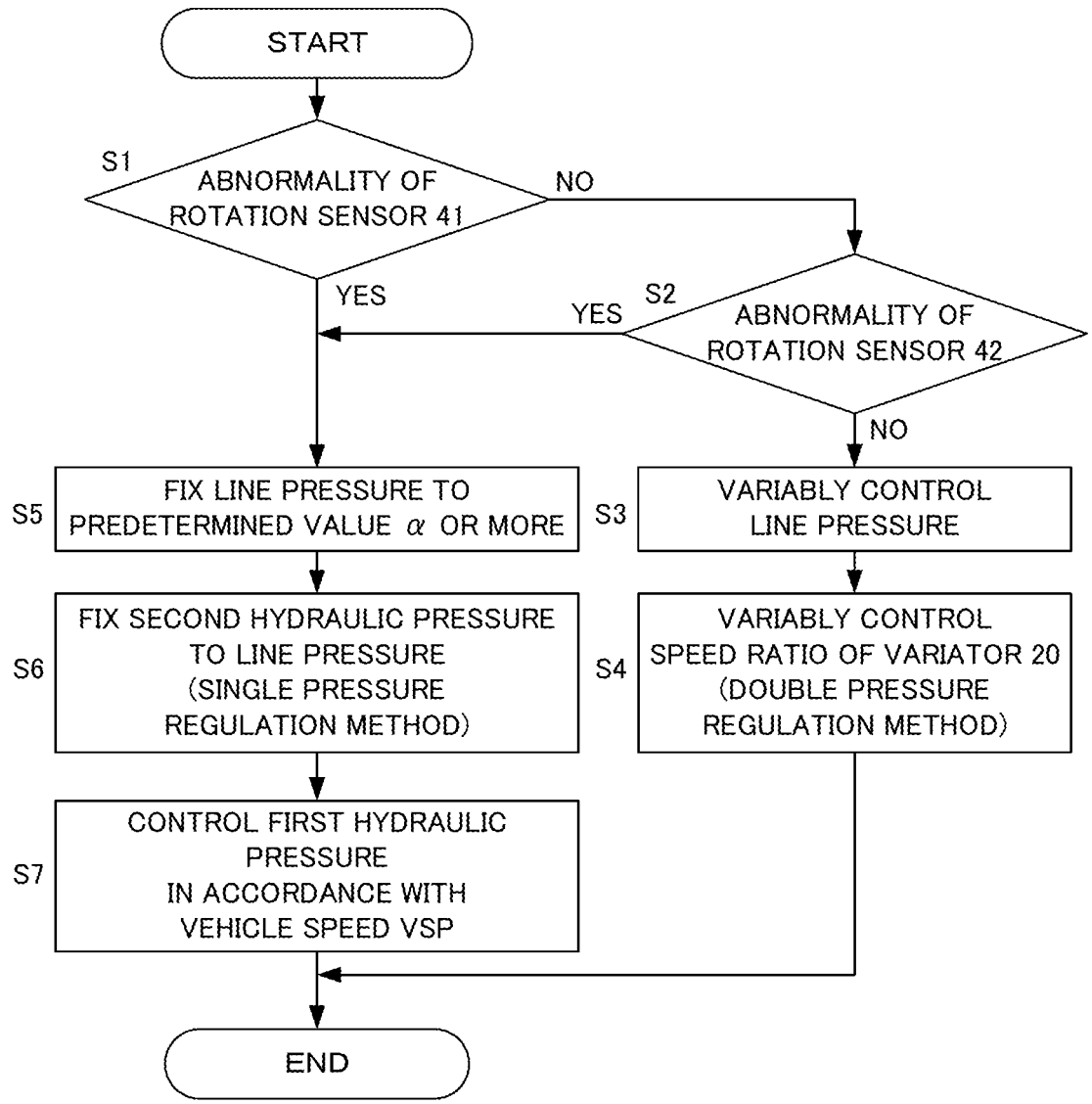
FIG. 2 is a flowchart showing one example of control performed by a controller.

FIG. 2 is a flowchart showing one example of the control performed by the controller 12. The controller 12 can repeatedly execute the process shown in this flowchart for every extremely-short time. The controller 12 determines whether or not the rotation sensor 41 is abnormal in Step S1. When a negative determination is provided in Step S1, the controller 12 determines whether or not the rotation sensor 42 is abnormal in Step S2.

In Step S1, the controller 12 can, for example, determine whether or not the rotation sensor 41 is disconnected or determine whether or not the output signal of the rotation sensor 41 is out of a normal range. The known technique and other appropriate techniques may be applied to a determination of whether or not the rotation sensor 41 is abnormal. The same is applied to a determination of Step S2.

When a negative determination is provided in Step S2, both the rotation sensor 41 and the rotation sensor 42 are determined to be normal. In this case, the controller 12 variably controls the line pressure by the line pressure adjustment unit 11s as shown in Step S3. The controller 12 also variably controls the speed ratio of the variator 20 by the double pressure regulation method as shown in Step S4.

The double pressure regulation method is a pressure regulation method in which a greater-than or less-than relationship is switched between the first hydraulic pressure and the second hydraulic pressure. Therefore, in the double pressure regulation method, the greater-than or less-than relationship between the first hydraulic pressure and the second hydraulic pressure includes a case of first hydraulic pressure>second hydraulic pressure, a case of first hydraulic pressure=second hydraulic pressure, and a case of first hydraulic pressure<second hydraulic pressure. Details of the double pressure regulation method will be described later. After Step S4, this flowchart is once ended. The sub-transmission mechanism 30 is also appropriately shifted in accordance with the shift control signal.

When a positive determination is provided in Step S1 or Step S2, failure of one of the rotation sensor 41 and the rotation sensor 42 is determined.

Determining failure of one of the rotation sensor 41 and the rotation sensor 42 means that failure of both the rotation sensor 41 and the rotation sensor 42 are not required as a determination, in other words, means that the failure of any one of the rotation sensor 41 and the rotation sensor 42 is required to be determined. Further, such a determination may be performed by determining whether or not only one of the rotation sensor 41 and the rotation sensor 42 is abnormal.

In a case where a positive determination is provided in Step S1 or Step S2, the controller 12 fixes the line pressure to a predetermined value α or more by the line pressure adjustment unit 11s as shown in Step S5. Fixing the line pressure to the predetermined value α or more means that the line pressure is maintained to be the predetermined value α or more until the failure is removed by repair or the like. For example, the maximum set pressure of the line pressure is applied to the predetermined value α or more. The predetermined value α or more may have a value with which slippage of the belt 23 is not generated when input torque to the variator 20 becomes maximum.

Further, the controller 12 fixes the second hydraulic pressure to the line pressure in Step S6. The controller 12 also controls the first hydraulic pressure in accordance with the vehicle speed VSP in Step S7. Thereby, by the single pressure regulation method of fixing the second hydraulic pressure to the line pressure, the speed ratio of the variator 20 is variably controlled.

The single pressure regulation method is a pressure regulation method in which the greater-than or less-than relationship is not switched between the first hydraulic pressure and the second hydraulic pressure. Therefore, in the single pressure regulation method, the greater-than or less-than relationship between the first hydraulic pressure and the second hydraulic pressure is maintained to be first hydraulic pressure second hydraulic pressure or first hydraulic pressure second hydraulic pressure. Details of the single pressure regulation method will be described later.

In Step S7, specifically, the controller 12 controls the first hydraulic pressure by not using an output of the rotation sensor 41 and an output of the rotation sensor 42 but using at least an output of the rotation sensor 43. Thereby, while avoiding an influence of failure, the speed ratio of the variator 20 can be controlled in accordance with the vehicle speed VSP. The output of the rotation sensor 43 can be used for generating the shift control signal which includes a speed ratio control command of the variator 20 at the time of failure.

In Step S7, the controller 12 may control the first hydraulic pressure by further using parameters other than the outputs of the rotation sensor 41, the rotation sensor 42, and the rotation sensor 43. That is, the shift control signal at the time of failure may be generated by further using the other parameters.

The controller 12 may fix the first hydraulic pressure to the line pressure in Step S6, and control the second hydraulic pressure in accordance with the vehicle speed VSP in Step S7.

In this case, the controller 12 can variably control the speed ratio of the variator 20 by the single pressure regulation method of fixing the first hydraulic pressure to the line pressure. After Step S7, this flowchart is once ended.

In the present embodiment, a failure determination unit is realized by the controller 12, specifically by part of the controller 12 functionally grasped as a portion that performs the determination of Step S1 and Step S2. A line pressure control unit is realized by the controller 12 and the hydraulic control circuit 11, specifically by part of the controller 12 functionally grasped as a portion that performs the process of Step S3 and Step S5, and the line pressure adjustment unit 11s serving as part of the hydraulic control circuit 11. A speed ratio control unit is realized by the controller 12 and the hydraulic control circuit 11, specifically by part of the controller 12 functionally grasped as a portion that performs the process of Steps S4, S6, S7, and the first hydraulic pressure adjustment unit 11a and the second hydraulic pressure adjustment unit 11b serving as part of the hydraulic control circuit 11.

Next, the pressure regulation methods will be described.

Figure 3A:
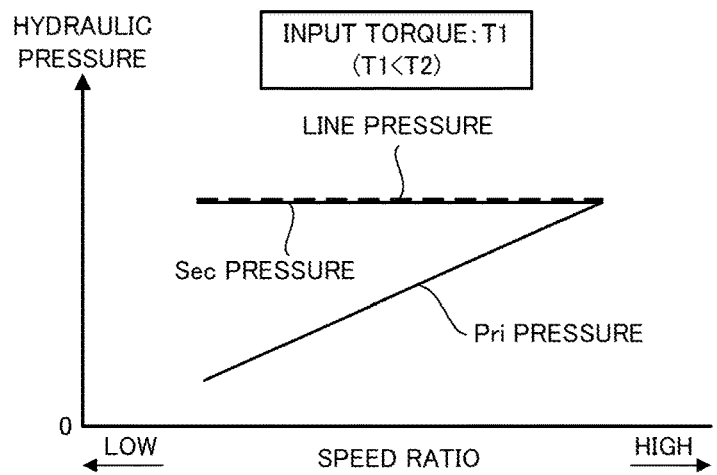
FIG. 3A is a first diagram of a diagram illustrating a comparative example of a pressure regulation method.
Figure 3B:
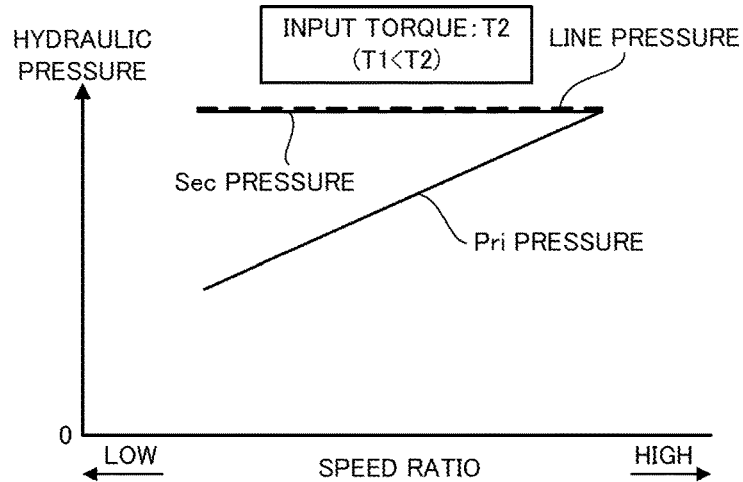
FIG. 3B is a second diagram of the diagram illustrating the comparative example of the pressure regulation method.
Figure 3C:
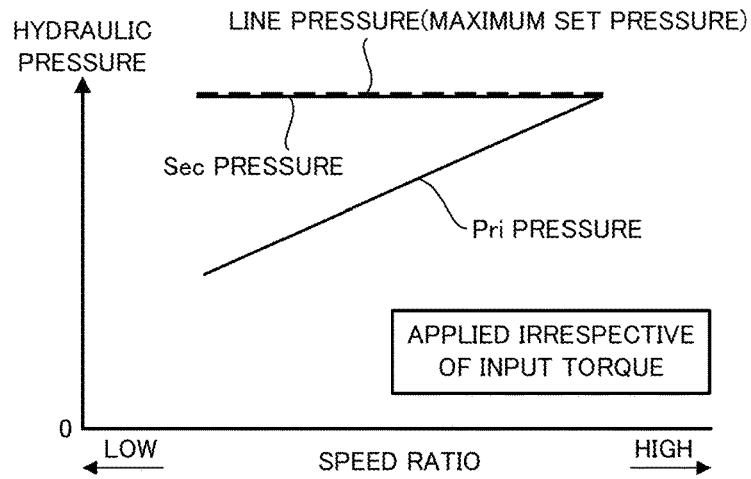
FIG. 3C is a third diagram of the diagram illustrating the comparative example of the pressure regulation method.

FIGS. 3A, 3B, and 3C are diagrams illustrating a comparative example of the pressure regulation method, specifically, diagrams illustrating the single pressure regulation method in a variator for the single pressure regulation method. FIG. 3A shows Pri pressure and Sec pressure in accordance with a speed ratio of the variator in a case where input torque to the variator is T1. FIG. 3B shows Pri pressure and Sec pressure in accordance with the speed ratio of the variator in a case where the input torque to the variator is T2. FIG. 3C shows Pri pressure and Sec pressure in accordance with the speed ratio of the variator in a case where line pressure is fixed to the maximum set pressure.

The Pri pressure is hydraulic pressure corresponding to the first hydraulic pressure, indicating hydraulic control pressure of a primary pulley in the variator for the single pressure regulation method. The Sec pressure is hydraulic pressure corresponding to the second hydraulic pressure, indicating hydraulic control pressure of a secondary pulley in the variator for the single pressure regulation method. It can be said that relationships between the speed ratio and the Pri pressure and the Sec pressure shown in FIGS. 3A to 3C are, in other words, relationships between the target speed ratio and Pri pressure and Sec pressure in accordance with the target speed ratio. T1 and T2 indicate the input torque satisfying a greater-than or less-than relationship of T1<T2. FIGS. 3A to 3C show a case where the Sec pressure is fixed to the line pressure.

As shown in FIGS. 3A, 3B, in a case where shift is performed by the variator for the single pressure regulation method, by making the Sec pressure the line pressure in the entire speed ratio region and changing the line pressure in accordance with the input torque, belt slippage is prevented. Pressure receiving areas of the primary pulley and the secondary pulley are set in such a manner that the speed ratio becomes high in a case where the Pri pressure and the Sec pressure become equal to each other.

In this case, the pressure receiving area of the primary pulley is set to be larger than the pressure receiving area of the secondary pulley. For example, the pressure receiving area of the primary pulley is about twice more than the pressure receiving area of the secondary pulley. The pressure receiving area of the primary pulley can be effectively increased by making the primary pulley have a double piston structure.

In such a variator for the single pressure regulation method, when the line pressure is fixed to the maximum set pressure, the Pri pressure and the Sec pressure are set as shown in FIG. 3C irrespective of the input torque. At this time, the Pri pressure and the Sec pressure are set within a range covering the entire speed ratio region.

Figure 4A:
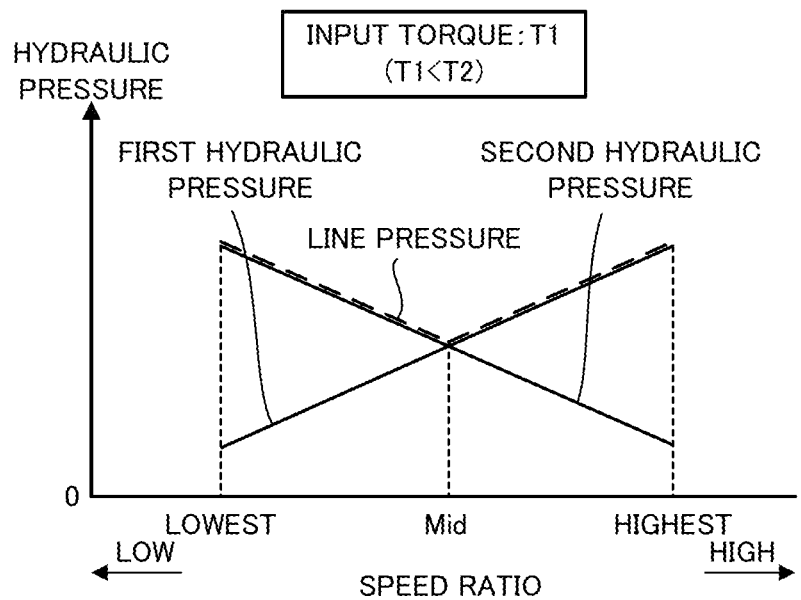
FIG. 4A is a first diagram of a diagram illustrating a double pressure regulation method.
Figure 4B:
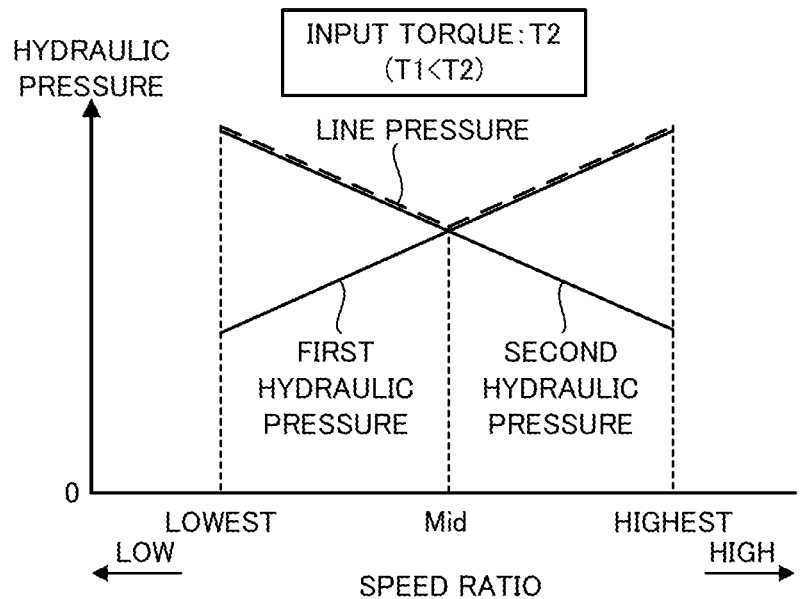
FIG. 4B is a second diagram of the diagram illustrating the double pressure regulation method.

FIGS. 4A and 4B are diagrams illustrating the double pressure regulation method. FIG. 4A shows the first hydraulic pressure and the second hydraulic pressure in accordance with the speed ratio of the variator 20 in a case where the input torque to the variator 20 is T1. FIG. 4B shows the first hydraulic pressure and the second hydraulic pressure in accordance with the speed ratio of the variator 20 in a case where the input torque to the variator 20 is T2.

The lowest speed ratio is the maximum speed ratio, and the highest speed ratio is the minimum speed ratio. The middle speed ratio is the intermediate speed ratio with which the first hydraulic pressure and the second hydraulic pressure are equal to each other. It can be said that relationships between the speed ratio and the first hydraulic pressure and the second hydraulic pressure shown in FIGS. 4A and 4B are, in other words, relationships between the target speed ratio and first hydraulic pressure and second hydraulic pressure in accordance with the target speed ratio. The same is applied to FIGS. 5A and 5B to be described later.

As shown in FIGS. 4A and 4B respectively, in the double pressure regulation method, the first hydraulic pressure and the second hydraulic pressure are set in such a manner that the greater-than or less-than relationship is switched between the first hydraulic pressure and the second hydraulic pressure in accordance with the speed ratio of the variator 20. The speed ratio of the variator 20 is variably controlled within a range from the lowest speed ratio to the highest speed ratio.

Specifically, in a speed ratio region of the lowest speed ratio or higher and lower than the middle speed ratio, the first hydraulic pressure and the second hydraulic pressure are set in such a manner that the second hydraulic pressure is greater than the first hydraulic pressure. At the middle speed ratio, the first hydraulic pressure and the second hydraulic pressure are set in such a manner that the first hydraulic pressure and the second hydraulic pressure are equal to each other. Further, in a speed ratio region of the highest speed ratio or lower and higher than the middle speed ratio, the first hydraulic pressure and the second hydraulic pressure are set in such a manner that the first hydraulic pressure is greater than the second hydraulic pressure.

In the double pressure regulation method, further, the line pressure is used for the greater hydraulic pressure among the first hydraulic pressure and the second hydraulic pressure set as described above.

Therefore, in the speed ratio region of the lowest speed ratio or higher and lower than the middle speed ratio, the second hydraulic pressure is the line pressure. In the speed ratio region of the highest speed ratio or lower and higher than the middle speed ratio, the first hydraulic pressure is the line pressure. At the middle speed ratio, the first hydraulic pressure and the second hydraulic pressure are the line pressure.

In the double pressure regulation method, by setting the first hydraulic pressure and the second hydraulic pressure as described above, in a case where the speed ratio is around the middle speed ratio, the line pressure can be lowered. Therefore, in a case where the speed ratio is around the middle speed ratio, fuel consumption can be improved by reduction of a load of the oil pump 10.

As shown in FIGS. 4A and 4B respectively, in the double pressure regulation method, both the first hydraulic pressure and the second hydraulic pressure are variable in a case where shift is performed. In the double pressure regulation method, at least under a condition that the input torque to the variator 20 is constant, both the first hydraulic pressure and the second hydraulic pressure can be variable. In other words, both the first hydraulic pressure and the second hydraulic pressure can be variable in accordance with the target speed ratio.

When pulley pressure is insufficient with respect to the input torque to the variator 20, slippage of the belt 23 may sometimes be generated. Since the pulley pressure cannot be greater than the line pressure, in order to have the pulley pressure with which slippage of the belt 23 is not generated, there is a need for changing the line pressure in accordance with the input torque. Therefore, as shown in FIGS. 4A and 4B, in the double pressure regulation method, further, the line pressure is changed in accordance with the input torque by the line pressure adjustment unit 11s. Specifically, the greater the input torque is, the more the line pressure is increased. Thereby, generation of slippage of the belt 23 can be suppressed.

In the variator 20 that performs shift by the double pressure regulation method, the pressure receiving area of the primary pulley 21 and the pressure receiving area of the secondary pulley 22 are set to be equal to each other. Therefore, in the variator 20, the speed ratio can be "one" at the middle speed ratio. The middle speed ratio is not necessarily "one" but for example a value different from "one" by the magnitude of thrust force of a return spring that biases the movable conical plate of the secondary pulley 22.

Figure 5A:
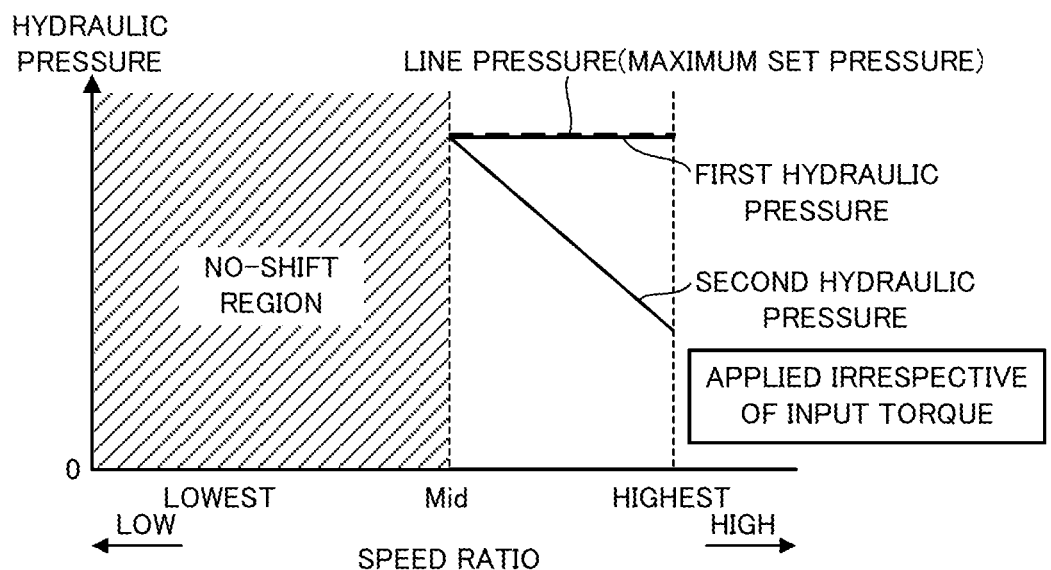
FIG. 5A is a first diagram of a diagram illustrating a single pressure regulation method in a variator for the double pressure regulation method.
Figure 5B:
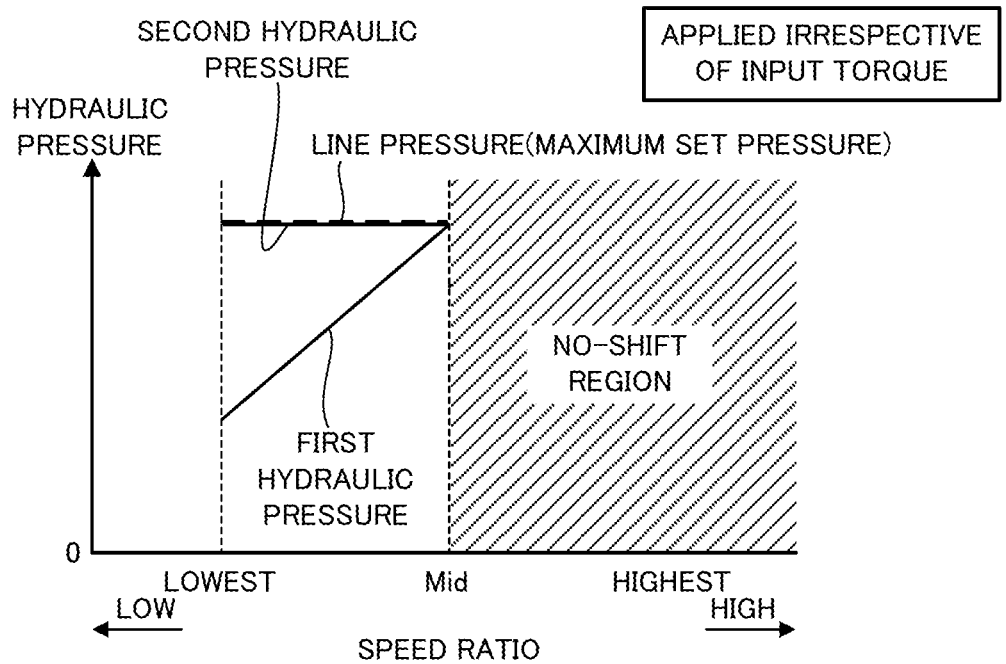
FIG. 5B is a second diagram of the diagram illustrating the single pressure regulation method in the variator for the double pressure regulation method.

FIGS. 5A and 5B are diagrams illustrating the single pressure regulation method in the variator 20 for the double pressure regulation method. FIG. 5A shows the first hydraulic pressure and the second hydraulic pressure in accordance with the speed ratio of the variator 20 in a case where the first hydraulic pressure is fixed to the line pressure. FIG. 5B shows the first hydraulic pressure and the second hydraulic pressure in accordance with the speed ratio of the variator 20 in a case where the second hydraulic pressure is fixed to the line pressure.

As shown in FIG. 5A, in a case where the first hydraulic pressure is fixed to the line pressure, the speed ratio region is restricted to a range of the middle speed ratio or higher and the highest speed ratio or lower. Therefore, shift can be performed only within a speed ratio region of the middle speed ratio or higher and the highest speed ratio or lower.

As shown in FIG. 5B, in a case where the second hydraulic pressure is fixed to the line pressure, the speed ratio region is restricted to a range of the lowest speed ratio or higher and the middle speed ratio or lower. Therefore, shift can be performed only within a speed ratio region of the lowest speed ratio or higher and the middle speed ratio or lower.

The reason is as follows. That is, this is because in the variator 20 for the double pressure regulation method, as described above, the pressure receiving area of the primary pulley 21 and the pressure receiving area of the secondary pulley 22 are set to be equal to each other, so that the first hydraulic pressure and the second hydraulic pressure are equal to each other at the middle speed ratio.

In both the cases of FIGS. 5A and 5B, by fixing the line pressure to the maximum set pressure, generation of slippage of the belt 23 is suppressed at a maximum.

Next, major operations and effects of the control device 50 will be described.

The control device 50 performs control in the transmission 100 having the variator 20, the rotation sensor 41, and the rotation sensor 42. The control device 50 has the hydraulic control circuit 11 and the controller 12. The controller 12 determines failure of one of the rotation sensor 41 and the rotation sensor 42. The hydraulic control circuit 11 and the controller 12 variably control the line pressure, and in a case where the failure is determined, fix the line pressure to the predetermined value α or more. The controller 12 variably controls the speed ratio of the variator 20 by the double pressure regulation method, and in a case where the failure is determined, variably controls the speed ratio of the variator 20 by the single pressure regulation method of fixing one of the first hydraulic pressure and the second hydraulic pressure to the line pressure.

With the control device 50 of such a configuration, in a case where the failure is determined, one hydraulic pressure of the first hydraulic pressure and the second hydraulic pressure is fixed to the line pressure of the predetermined value α or more. Thus, the one hydraulic pressure can be increased. By increasing the one hydraulic pressure, the other hydraulic pressure is also boosted. Thus, the first hydraulic pressure and the second hydraulic pressure can be increased. As a result, at the time of failure of the rotation sensor 41 and the rotation sensor 42, a fail-safe that prevents belt slippage can be performed.

With the control device 50 of such a configuration, in a case where the failure is determined, the speed ratio of the variator 20 is variably controlled by the single pressure regulation method of fixing the one hydraulic pressure to the line pressure. Thus, the speed ratio can be changed within an available range in accordance with an operation state of a vehicle or the like. Therefore, in comparison to a case where the speed ratio of the variator 20 is fixed to the maximum speed ratio, that is, the lowest speed ratio or the like at the time of failure, deterioration of fuel consumption can also be suppressed.

In the control device 50, the hydraulic control circuit 11 and the controller 12 variably control the speed ratio of the variator 20 within the range from the lowest speed ratio to the highest speed ratio by the double pressure regulation method. Meanwhile, in a case where the failure is determined, the hydraulic control circuit 11 and the controller 12 variably control the speed ratio of the variator 20 within a range from the lowest speed ratio to the middle speed ratio by the single pressure regulation method of fixing the second hydraulic pressure to the line pressure.

With the control device 50 of such a configuration, in a case where the failure is determined, the speed ratio of the variator 20 is variably controlled within the range from the lowest speed ratio to the middle speed ratio. Thus, driving force at the time of starting the vehicle can be ensured.

In the control device 50, the predetermined value α or more is the maximum set pressure of the line pressure. In this case, generation of slippage of the belt 23 can be suppressed at a maximum.

The transmission 100 further has the sub-transmission mechanism 30 and the rotation sensor 43. In the control device 50, the hydraulic control circuit 11 and the controller 12 control both the first hydraulic pressure and the second hydraulic pressure by using at least the output of the rotation sensor 41, the output of the rotation sensor 42, and the output of the rotation sensor 43. Meanwhile, in a case where the failure is determined, the hydraulic control circuit 11 and the controller 12 control the hydraulic pressure which is not fixed to the line pressure among the first hydraulic pressure and the second hydraulic pressure by not using the output of the rotation sensor 41 and the output of the rotation sensor 42 but using at least the output of the rotation sensor 43.

In the control device 50 of such a configuration, at a normal time, in order to generate the hydraulic pressure in accordance with the input torque to the variator 20, hydraulic control of using the output of the rotation sensor 41, the output of the rotation sensor 42, and the output of the rotation sensor 43 can be performed. Meanwhile, such hydraulic control cannot be implemented when any of the rotation sensor 41 and the rotation sensor 42 is failed.

Therefore, in the control device 50 of such a configuration, in a case where the failure is determined, after one of the first hydraulic pressure and the second hydraulic pressure is fixed to the line pressure of the predetermined value α or more, the hydraulic pressure which is not fixed to the line pressure among the first hydraulic pressure and the second hydraulic pressure is controlled as described above. Thereby, irrespective of the input torque, the hydraulic pressure can be controlled.

The embodiment of the present invention is described above. However, the above embodiment does not intend to limit the technical scope of the present invention to the specific configurations of the above embodiment but only indicates part of application examples of the present invention.

The present application claims a priority based on Japanese Patent Application No. 2015-57897 filed with the Japan Patent Office on Mar. 20, 2015, all the contents of which are hereby incorporated by reference.

The invention claimed is:

1. A transmission control device for controlling a transmission, the transmission having:
 a variator having a primary pulley whose groove width is controlled by a first hydraulic pressure, a secondary pulley whose groove width is controlled by a second hydraulic pressure, and a belt looped over the primary pulley and the secondary pulley;
 a variator input side rotation sensor adapted to detect rotation speed on the input side of the variator; and
 a variator output side rotation sensor adapted to detect rotation speed on the output side of the variator,
 the transmission control device comprising:
 a controller adapted to determine failure of one of the variator input side rotation sensor and the variator output side rotation sensor; and
 a hydraulic control circuit adapted together with the controller to:
  variably control a line pressure serving as source pressure of the first hydraulic pressure and the second hydraulic pressure, and in a case where the failure is determined, to fix the line pressure to a predetermined value or more;
  variably control the speed ratio of the variator by a double pressure regulation method of making both the first hydraulic pressure and the second hydraulic pressure variable, the hydraulic control circuit and the controller being adapted to control the speed ratio of the variator on the basis of the variator input side rotation sensor and the variator output side rotation sensor; and
  variably control the speed ratio of the variator by a single pressure regulation method of fixing one of the first hydraulic pressure and the second hydraulic pressure to the line pressure and variably controlling the other on the basis of a vehicle speed in a case where the failure is determined.

2. The transmission control device according to claim 1, wherein
 the hydraulic control circuit and the controller variably control the speed ratio of the variator within a range from the lowest speed ratio to the highest speed ratio by the double pressure regulation method of making both the first hydraulic pressure and the second hydraulic pressure variable, and in a case where the failure is determined, variably control the speed ratio of the variator within a range from the lowest speed ratio to the intermediate speed ratio by the single pressure regulation method of fixing the second hydraulic pressure to the line pressure.

3. The transmission control device according to claim 1, wherein
 the predetermined value or more is the maximum set pressure of the line pressure.

4. The transmission control device according to claim 1, wherein
 the transmission further has:
 a sub-transmission mechanism provided on the output side of the variator; and
 a sub-transmission mechanism output side rotation sensor adapted to detect rotation speed on the output side of the sub-transmission mechanism, wherein
 the hydraulic control circuit and the controller control both the first hydraulic pressure and the second hydraulic pressure by using at least an output of the variator input side rotation sensor, an output of the variator output side rotation sensor, and an output of the sub-transmission mechanism output side rotation sensor, and in a case where the failure is determined, control the hydraulic pressure which is not fixed to the line pressure among the first hydraulic pressure and the second hydraulic pressure by not using the output of the variator input side rotation sensor and the output of the variator output side rotation sensor but using at least the output of the sub-transmission mechanism output side rotation sensor.

5. A transmission control method for controlling a transmission, the transmission having:
 a variator having a primary pulley whose groove width is controlled by a first hydraulic pressure, a secondary pulley whose groove width is controlled by a second hydraulic pressure, and a belt looped over the primary pulley and the secondary pulley;
 a variator input side rotation sensor adapted to detect rotation speed on the input side of the variator; and
 a variator output side rotation sensor adapted to detect rotation speed on the output side of the variator,
 the transmission control method comprising:
 determining failure of one of the variator input side rotation sensor and the variator output side rotation sensor;
 variably controlling a line pressure serving as source pressure of the first hydraulic pressure and the second hydraulic pressure, and in a case where the failure is determined, fixing the line pressure to a predetermined value or more;
 variably controlling a speed ratio of the variator by a double pressure regulation method of making both the first hydraulic pressure and the second hydraulic pressure variable when controlling the speed ratio of the variator on the basis of the variator input side rotation sensor and the variator output side rotation sensor; and
 variably controlling the speed ratio of the variator by a single pressure regulation method of fixing one of the first hydraulic pressure and the second hydraulic pressure to the line pressure and variably controlling the other on the basis of a vehicle speed in a case where the failure is determined.

6. A control device for a transmission having:
 a variator having a primary pulley whose groove width is controlled by a first hydraulic pressure, a secondary pulley whose groove width is controlled by a second hydraulic pressure, and a belt looped over the primary pulley and the secondary pulley;
 a variator input side rotation sensor adapted to detect rotation speed on the input side of the variator; and
 a variator output side rotation sensor adapted to detect rotation speed on the output side of the variator,
 the control device being adapted to perform control in the transmission, comprising:

failure determination means for determining failure of one of the variator input side rotation sensor and the variator output side rotation sensor;

line pressure control means for variably controlling a line pressure serving as source pressure of the first hydraulic pressure and the second hydraulic pressure, and in a case where the failure is determined, for fixing the line pressure to a predetermined value or more; and speed ratio control means for:
  variably controlling a speed ratio of the variator by a double pressure regulation method of making both the first hydraulic pressure and the second hydraulic pressure variable, the speed ratio control means controlling the speed ratio of the variator on the basis of the variator input side rotation sensor and the variator output side rotation sensor; and
  variably controlling the speed ratio of the variator by a single pressure regulation method of fixing one of the first hydraulic pressure and the second hydraulic pressure to the line pressure and variably controlling the other on the basis of a vehicle speed in a case where the failure is determined.

* * * * *